United States Patent
Xu

(10) Patent No.: US 9,625,774 B2
(45) Date of Patent: Apr. 18, 2017

(54) ARRAY SUBSTRATE, MANUFACTURING METHOD FOR THE SAME, AND LIQUID CRYSTAL DISPLAY PANEL

(71) Applicant: SHENZHEN CHINA STAR OPTOELECTRONICS TECHNOLOGY CO., LTD., Shenzhen, Guangdong (CN)

(72) Inventor: Xiangyang Xu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 305 days.

(21) Appl. No.: 14/386,721

(22) PCT Filed: Jun. 26, 2014

(86) PCT No.: PCT/CN2014/080794
§ 371 (c)(1),
(2) Date: Sep. 19, 2014

(87) PCT Pub. No.: WO2015/180225
PCT Pub. Date: Dec. 3, 2015

(65) Prior Publication Data
US 2016/0246101 A1    Aug. 25, 2016

(30) Foreign Application Priority Data

May 30, 2014    (CN) .......................... 2014 1 0239050

(51) Int. Cl.
*G02F 1/1343*    (2006.01)
*G02F 1/1345*    (2006.01)
(Continued)

(52) U.S. Cl.
CPC ........ *G02F 1/13452* (2013.01); *G02F 1/1345* (2013.01); *G02F 1/1368* (2013.01);
(Continued)

(58) Field of Classification Search
CPC ..... G02F 1/136286; G02F 2001/13629; G02F 2001/136295; G02F 1/13452
See application file for complete search history.

(56) References Cited

U.S. PATENT DOCUMENTS

2003/0193638 A1*    10/2003    Masutani .......... G02F 1/134363
349/141
2005/0285987 A1    12/2005    Azumada et al.
(Continued)

FOREIGN PATENT DOCUMENTS

CN    1713058    12/2005
CN    101055383    10/2007
(Continued)

*Primary Examiner* — Phu Vu
(74) *Attorney, Agent, or Firm* — Muncy, Geissler, Olds & Lowe, P.C.

(57) ABSTRACT

An array substrate, a manufacturing method for the same, and an LCD panel are provided. The array substrate includes a substrate, a first metal layer, a first insulative layer, a semiconductor layer, a second metal layer, a transparent electrode layer, and a second insulative layer. The transparent electrode layer includes a pixel electrode and a reinforcing part. The reinforcing part is disposed on a trace by the transparent electrode layer in the invention, so that the trace located on the second metal layer is more stable and is almost unbreakable.

19 Claims, 3 Drawing Sheets

(51) Int. Cl.
*G02F 1/1333* (2006.01)
*G02F 1/1335* (2006.01)
*G02F 1/1368* (2006.01)

(52) U.S. Cl.
CPC .... *G02F 1/13439* (2013.01); *G02F 1/133345* (2013.01); *G02F 1/133514* (2013.01); *G02F 1/134309* (2013.01)

(56) References Cited

U.S. PATENT DOCUMENTS

| | | | |
|---|---|---|---|
| 2010/0109993 A1 | 5/2010 | Chang | |
| 2010/0283931 A1* | 11/2010 | Horiuchi | G02F 1/1345 349/46 |
| 2011/0096449 A1* | 4/2011 | Lee | G02F 1/1345 361/91.1 |
| 2012/0162055 A1* | 6/2012 | Hara | G02F 1/1362 345/92 |
| 2013/0161626 A1* | 6/2013 | Jo | H01L 27/156 257/59 |

FOREIGN PATENT DOCUMENTS

| | | |
|---|---|---|
| CN | 103064207 | 4/2013 |
| CN | 202585418 | 4/2013 |
| CN | 103176321 | 6/2013 |
| CN | 103280428 | 9/2013 |

\* cited by examiner

ARRAY SUBSTRATE, MANUFACTURING METHOD FOR THE SAME, AND LIQUID CRYSTAL DISPLAY PANEL

BACKGROUND OF THE INVENTION

1. Field of the Invention

The present invention relates to a field of display technology, and more specifically to an array substrate, a manufacturing method for the same, and a liquid crystal display (LCD) panel.

2. Description of the Prior Art

A thin film transistor (TFT) LCD panel, as a low-carbon, green, and environment-friendly display device, has been widely used in people's production and life. Due to the development of display technology, the quality and the cost of a product engender the competitive motivation of LCD panel manufacturers.

For the LCD panel manufacturers, the numbers of driving chips used in a panel are generally reduced as much as possible in order to reduce the manufacturing costs of the product. For example, each driving chip can drive as many elements as possible by increasing the length of a trace. Therefore, the design of a double metal trace is generally used in a large-size LCD panel to improve the technical problem of high line resistance which is caused by the length of the trace being too long.

The specific structure of an existing double metal trace refers to FIG. 1. FIG. 1 is a schematic view of a structure of an array substrate in an existing LCD panel. For illustrative purposes, the specific size of the structure in FIG. 1 is modified based on illustrative requirements. In FIG. 1, a reference number 101 is a substrate, a reference number 102 is a first insulative layer, a reference number 103 is a second insulative layer, a reference number 104 is a first metal layer, a reference number 105 is a second metal layer, and a reference number 106 is a pixel electrode layer. The reference number 106 can also be an electrode which is used for an internal connection (such as that is connected between the first metal layer 104 and the second metal layer 105) or can also be an electrode which is used for an external connection (such as that connects the driving chip, and the like).

The array substrate is divided into five areas in accordance with the function of each portion of the array substrate. That is, the A area of the array substrate is a thin-film field-effect transistor, the B area of the array substrate is a pixel electrode, the C area of the array substrate is a jumper area for realizing a connection between two metal layers, the D area of the array substrate is the fan-out area of the trace, and the E area of the array substrate is a connection area which connects the driving chip.

The D area is traced by the first metal layer 104 and the second metal layer 105 to efficiently avoid a problem of high line resistance of the trace. However, the second metal layer 105 is generally disposed on a non-planar film (i.e., the bottom of the second metal layer 105 is often uneven), so as to easily cause the breakage of the second metal layer 105, thereby leading to a signal which cannot be normally transferred from the trace of the D area, while the effect of the above defect is difficultly found in a method for manufacturing the array substrate. Therefore, the display quality of the LCD panel is greatly affected.

Therefore, there is a need to provide an array substrate, a manufacturing method for the same, and an LCD panel, so as to overcome the disadvantage in the prior art.

SUMMARY OF THE INVENTION

An object of the present invention is to provide an array substrate, a manufacturing method for the same, and an LCD panel, thereby a technical problem of the reduction of the display quality of the corresponding LCD panel is solved. The reduction is caused by a second metal layer as a trace in an existing array substrate being easily broken.

To overcome the above-mentioned disadvantages, the technical schemes provided by the present invention are hereunder illustrated.

The embodiment of the present invention provides an array substrate, which includes:

a substrate;
a first metal layer disposed on the substrate, the first metal layer including a scanning line and a gate electrode area of a thin-film field-effect transistor;
a first insulative layer disposed partially on the first metal layer;
a semiconductor layer disposed on the first insulative layer;
a second metal layer disposed on the semiconductor layer, the second metal layer including a source electrode area of the thin-film field-effect transistor, a drain electrode area of the thin-film field-effect transistor, a data line, and a trace;
a transparent electrode layer including a pixel electrode connected to the drain electrode area and a reinforcing part covered on the trace; and
a second insulative layer disposed on the transparent electrode layer and the thin-film field-effect transistor.

In the array substrate of the present invention, the transparent electrode layer further includes:

an internal connection electrode connected between the first metal layer and the second metal layer.

In the array substrate of the present invention, the transparent electrode layer further includes:

an external connection electrode which is connected between the first metal layer and a driving chip, and is connected between the second metal layer and a driving chip.

In the array substrate of the present invention, the thickness of the first metal layer is between 0.1 µm (micrometers) and 0.6 µm, and the thickness of the second metal layer is between 0.1 µm and 0.6 µm.

In the array substrate of the present invention, the thickness of the first insulative layer is between 0.2 µm and 0.5 µm, and the thickness of the semiconductor layer is between 0.1 µm and 0.3 µm, and the thickness of the second insulative layer is between 0.2 µm and 0.5 µm.

In the array substrate of the present invention, the thickness of the transparent electrode layer is between 0.01 µm and 0.1 µm.

The embodiment of the present invention further provides a method for manufacturing an array substrate. The method includes the following steps of:

(A) forming a layered structure onto a substrate, wherein the layered structure is a first metal layer;
(B) patterning the layered structure to form a scanning line and a gate electrode area of a thin-film field-effect transistor;
(C) forming sequentially a first insulative layer, a semiconductor layer, and a second metal layer onto the layered structure;
(D) patterning the layered structure to form a source electrode area of the thin-film field-effect transistor, a drain electrode area of the thin-film field-effect transistor, a data line, and a trace;
(E) forming a transparent electrode layer onto the layered structure, and patterning the layered structure to form a pixel electrode and a reinforcing part covered on the trace; and (F) forming a second insulative layer onto the layered structure, and patterning the layered structure to cover the transparent electrode layer and the thin-film field-effect transistor.

In the method according to the present invention for manufacturing the array substrate, the step (E) further comprises the following step of:

forming the transparent electrode layer onto the layered structure, and patterning the layered structure to form an internal connection electrode. The internal connection electrode is connected between the first metal layer and the second metal layer.

In the method according to the present invention for manufacturing the array substrate, the step (E) further comprises the following step of:

forming the transparent electrode layer onto the layered structure, and patterning the layered structure to form an external connection electrode. The external connection electrode is connected between the first metal layer and a driving chip, and is connected between the second metal layer and a driving chip.

In the method according to the present invention for manufacturing the array substrate, the thickness of the first metal layer is between 0.1 µm and 0.6 µm, and the thickness of the second metal layer is between 0.1 µm and 0.6 µm.

In the method according to the present invention for manufacturing the array substrate, the thickness of the first insulative layer is between 0.2 µm and 0.5 µm, the thickness of the semiconductor layer is between 0.1 µm and 0.3 µm, and the thickness of the second insulative layer is between 0.2 µm and 0.5 µm.

In the method according to the present invention for manufacturing the array substrate, the thickness of the transparent electrode layer is between 0.01 µm and 0.1 µm.

The embodiment of the present invention further provides an LCD panel, which includes a color film substrate, an array substrate, and a liquid crystal layer sandwiched between the color film substrate and the array substrate. The array substrate includes:

a substrate;

a first metal layer disposed on the substrate, the first metal layer including a scanning line and a gate electrode area of a thin-film field-effect transistor;

a first insulative layer disposed partially on the first metal layer;

a semiconductor layer disposed on the first insulative layer;

a second metal layer disposed on the semiconductor layer, the second metal layer including a source electrode area of the thin-film field-effect transistor, a drain electrode area of the thin-film field-effect transistor, a data line, and a trace;

a transparent electrode layer including a pixel electrode connected to the drain electrode area and a reinforcing part covered on the trace; and a second insulative layer disposed on the transparent electrode layer and the thin-film field-effect transistor.

In the LCD panel of the present invention, the transparent electrode layer further includes:

an internal connection electrode connected between the first metal layer and the second metal layer.

In the LCD panel of the present invention, the transparent electrode layer further includes:

an external connection electrode which is connected between the first metal layer and a driving chip, and is connected between the second metal layer and a driving chip.

In the LCD panel of the present invention, the LCD panel is a twisted nematic display panel or a vertical alignment type display panel.

In the LCD panel of the present invention, the thickness of the first metal layer is between 0.1 µm and 0.6 µm, and the thickness of the second metal layer is between 0.1 µm and 0.6 µm.

In the LCD panel of the present invention, the thickness of the first insulative layer is between 0.2 µm and 0.5 µm, the thickness of the semiconductor layer is between 0.1 µm and 0.3 µm, and the thickness of the second insulative layer is between 0.2 µm and 0.5 µm.

In the LCD panel of the present invention, the thickness of the transparent electrode layer is between 0.01 µm and 0.1 µm.

In comparison to the existing array substrate, the manufacturing method for the same, and the LCD panel, a reinforcing part is disposed on the trace by the transparent electrode layer in the array substrate, the manufacturing method for the same, and the LCD panel of the present invention, so that the trace located on the second metal layer is more stable and is almost unbreakable, thereby ensuring the display quality of the corresponding LCD panel. Therefore, the technical problem of the reduction of the display quality of the corresponding LCD panel is solved. The reduction is caused by the second metal layer as the trace in the existing array substrate being easily broken.

The above objectives, and other objectives, features, advantages, and embodiments of the present invention will be better understood from the following description being considered in connection with the accompanied drawings, and in which two preferred embodiments of the invention are illustrated by way of example.

DETAILED DESCRIPTION OF THE PREFERRED EMBODIMENTS

Figure 1:
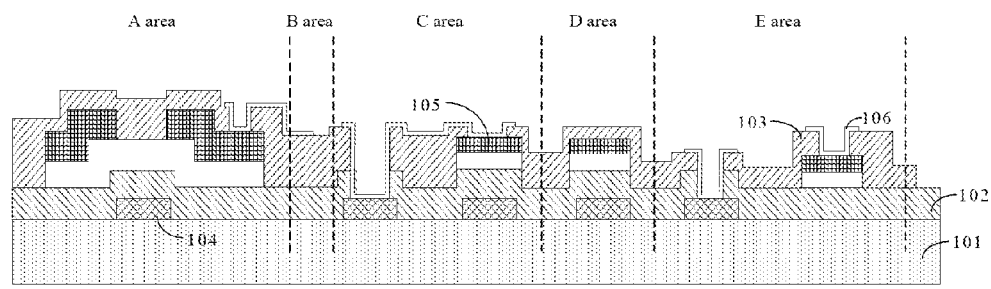
FIG. 1 is a schematic view of a structure of an array substrate in an existing LCD panel.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", "left", "right", "inside", "outside", "side", etc., is used with reference to the orientation of the Figure(s) being described. As such, the directional terminology is used for purposes of illustration, and is in no way limiting.

Throughout this specification and in the drawings like parts will be referred to by the same reference numerals.

Figure 2:
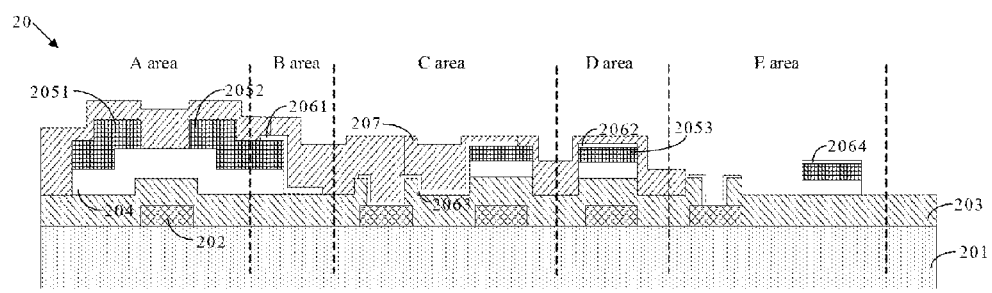
FIG. 2 is a schematic view of a structure of an array substrate in an LCD panel according to a first preferred embodiment of the present invention.

Please refer to FIG. 2, which is a schematic view of a structure of an array substrate in an LCD panel according to a first preferred embodiment of the present invention. The LCD panel of the preferred embodiment is a twisted nematic display panel. The array substrate 20 of the LCD panel includes a substrate 201, a first metal layer 202, a first insulative layer 203, a semiconductor layer 204, a second metal layer, a transparent electrode layer, and a second insulative layer 207.

The first metal layer 202 is disposed on the substrate 201. The first metal layer 202 includes a scanning line and a gate electrode area of a thin-film field-effect transistor. The first insulative layer 203 is partially disposed on the first metal layer 202. The semiconductor layer 204 is disposed on the first insulative layer 203. The second metal layer is disposed on the semiconductor layer 204. The second metal layer includes a source electrode area 2051 of the thin-film field-effect transistor, a drain electrode area 2052 of the thin-film field-effect transistor, a data line (not shown in the figure), and a trace 2053. The transparent electrode layer includes a pixel electrode 2061 connected to the drain electrode area 2052 of the thin-film field-effect transistor and a reinforcing part 2062 covered on the trace 2053. The second insulative layer 207 is disposed on the transparent electrode layer and the thin-film field-effect transistor. The transparent electrode layer 206 further includes an internal connection electrode 2063 and an external connection electrode 2064. The internal connection electrode 2063 is connected between the first metal layer 202 and the second metal layer 205. The external connection electrode 2064 is connected between the first metal layer 202 and a driving chip, and is connected between the second metal layer 205 and a driving chip.

Please refer to FIG. 2. The sizes of the divided areas of the array substrate in FIG. 2 are not the actual sizes, in order to facilitate the illustration of the function of the array substrate 20. The A area of the array substrate 20 includes the thin-film field-effect transistor. The B area of the array substrate 20 includes the pixel electrode 2061 formed from the transparent electrode layer. The C area of the array substrate 20 includes the internal connection electrode 2063 formed from the transparent electrode layer. The D area of the array substrate 20 includes the trace 2053 formed from the second metal layer and the reinforcing part 2062 formed from the transparent electrode layer. The E area of the array substrate 20 includes the external connection electrode 2064 formed from the transparent electrode layer.

When the array substrate 20 of the LCD panel of the preferred embodiment is used, the structure of the thin-film field-effect transistor of the A area of the array substrate 20 is similar to the structure of the thin-film field-effect transistor of the A area of in FIG. 1. Therefore, the working principle of the thin-film field-effect transistor of the A area of the array substrate 20 is the same as the working principle of the thin-film field-effect transistor of the A area of in FIG. 1.

The difference between the pixel electrode 2061 of the B area of the array substrate 20 and the pixel electrode of the B area in FIG. 1 is that the pixel electrode 2061 of the preferred embodiment is disposed under the second insulative layer 207, but the second insulative layer 207 is generally a transparent silicon nitride film, thereby the normal function of the pixel electrode 2061 is not affected. Therefore, the working principle of the pixel electrode 2061 of the B area of the preferred embodiment is the same as the working principle of the pixel electrode of the B area in FIG. 1.

The difference between the internal connection electrode 2063 of the C area of the array substrate and the jumper area of the C area in FIG. 1 is that the internal connection electrode 2063 of the preferred embodiment is disposed under the second insulative layer 207, but the second insulative layer 207 is also generally a transparent silicon nitride film, thereby the normal function of the internal connection electrode 2063 is not affected. Therefore, the working principle of the internal connection electrode 2063 of the C area of the preferred embodiment is the same as the working principle of the jumper area of the C area in FIG. 1.

The difference between the trace 2053 of the D area of the array substrate and the fan-out area of the trace of the D area in FIG. 1 is that the reinforcing part 2062 formed from the transparent electrode layer is covered on the trace 2053 of the preferred embodiment. In this way, the stability of the trace 2053 on the second metal layer can be enhanced by the reinforcing part 2062, so that the trace 205 on the second metal layer is almost unbreakable. Furthermore, the conductivity of the trace 2053 can be further enhanced since the reinforcing part 2062 is made of a conductive material. The working principle of the trace 2053 of the D area is the same as the working principle of the trace of the D area in FIG. 1.

The external connection electrode 2064 of the E area of the array substrate can be achieved to be connected between the driving chip and the first metal layer 202, or can be achieved to be connected between the driving chip and the second metal layer. Therefore, the function and the working principle of the E area of the preferred embodiment are the same as the function and the working principle of the E area in FIG. 1.

Figure 3:
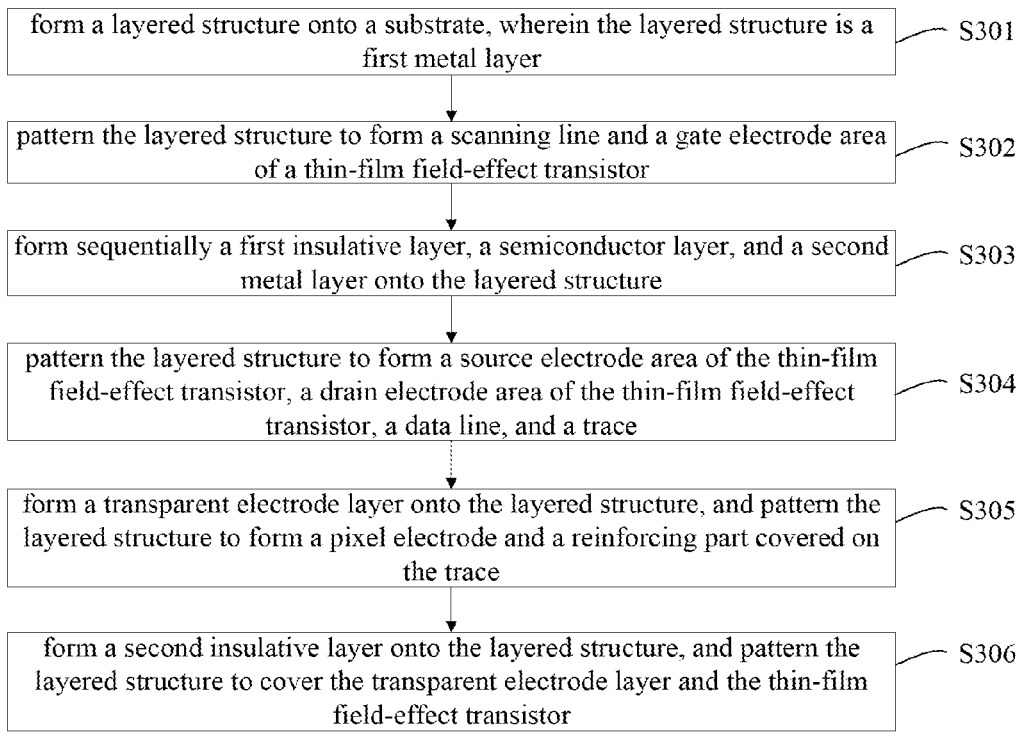
FIG. 3 is a flow chart of a method according to a first preferred embodiment of the present invention for manufacturing an array substrate in an LCD panel.

A method according the preferred embodiment for manufacturing an array substrate in an LCD panel will be described in detail hereinafter by FIG. 3. FIG. 3 is the flow chart of the method according to a first preferred embodiment of the present invention for manufacturing the array substrate in the LCD panel. The method for manufacturing the array substrate includes the following steps.

In step S301, a layered structure is formed on a substrate. The layered structure is a first metal layer. Specifically, the first metal layer having a thickness between 0.1 µm and 0.6 µm is formed on the substrate, and the material of the first metal layer can be chromium (Cr), molybdenum (Mo), aluminum (Al), copper (Cu), or the like. Then, step S302 is executed.

In step S302, the layered structure is patterned to form a scanning line and a gate electrode area of a thin-film field-effect transistor. Specifically, the first metal layer is wet-etched by a photo mask process to form the scanning line and the gate electrode area of the thin-film field-effect transistor. Then, step S303 is executed.

In step S303, a first insulative layer, a semiconductor layer, and a second metal layer are formed on the layered structure, sequentially. Specifically, the first insulative layer (e.g., a silicon nitride layer) having a thickness between 0.2 µm and 0.5 µm is formed on the layered structure, and then the semiconductor layer (e.g., an amorphous silicon layer) having a thickness between 0.1 µm and 0.3 µm is manufactured, and then the second metal layer having a thickness between 0.1 µm and 0.6 µm is manufactured. Then, step S304 is executed.

In step S304, the layered structure is patterned to form a source electrode area of the thin-film field-effect transistor, a drain electrode area of the thin-film field-effect transistor, a data line, and a trace. Specifically, the layered structure is patterned by a gray tone mask process. On the C area and the E area of the array substrate, the second metal layer is wet-etched, the semiconductor layer is dry-etched, and the first insulative layer is dry-etched, so as to form a via hole connected to the first metal layer.

On the B area of the array substrate, the second metal layer is wet-etched, and the semiconductor layer is dry-etched, so as to form a pixel electrode area.

On the A area of the array substrate, the second metal layer is wet-etched, and the semiconductor layer is dry-etched, so as to form the source electrode area of the thin-film field-effect transistor, the drain electrode area of the thin-film field-effect transistor, and a channel between the source electrode area and the drain electrode area, as well as the data line of the LCD panel.

On the D area of the array substrate, the second metal layer is wet-etched, and the semiconductor layer is dry-etched, so as to form the trace of the LCD panel. Then, step S305 is executed.

In step S305, a transparent electrode layer is formed on the layered structure, and the layered structure is patterned to form the pixel electrode and a reinforcing part covered on the trace. Specifically, the transparent electrode layer (such as indium tin oxide, indium zinc oxide, or the like) having a thickness between 0.01 μm and 0.1 μm is formed on the layered structure. The layered structure is patterned by a photo mask process, so that the pixel electrode is formed on the B area of the array substrate, an internal connection electrode is formed on the C area of the array substrate (through the via hole located on the C area), the reinforcing part covered on the trace is formed on the D area of the array substrate, and an external connection electrode is formed on the E area of the array substrate (through the via hole located on the E area). Then, step S306 is executed.

In step S306, a second insulative layer is formed on the layered structure, and the layered structure is patterned to cover the transparent electrode layer and the thin-film field-effect transistor. Specifically, the second insulative layer having a thickness between 0.2 μm and 0.5 μm is formed on the layered structure. The layered structure is patterned by a photo mask process to cover and protect the transparent electrode layer and the thin-film field-effect transistor.

In this way, the method according to the preferred embodiment for manufacturing the array substrate in the LCD panel is completed.

In the array substrate, the manufacturing method for the same, and the LCD panel in accordance with the preferred embodiment, the reinforcing part is disposed on the trace by the transparent electrode layer, so that the trace located on the first metal layer is more stable and is almost unbreakable, thereby ensuring the display quality of the corresponding LCD panel.

Figure 4:
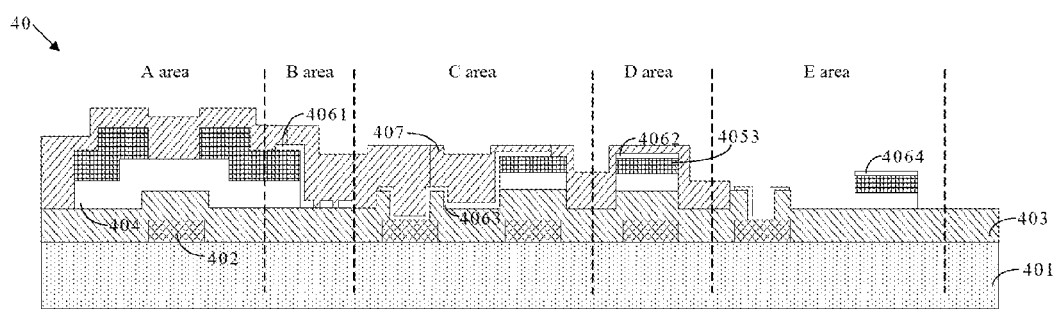
FIG. 4 is a schematic view of a structure of an array substrate in an LCD panel according to a second preferred embodiment of the present invention.

Please refer to FIG. 4, which is a schematic view of a structure of an array substrate in an LCD panel according to a second preferred embodiment of the present invention. The LCD panel of the preferred embodiment is a vertical alignment type display panel. The array substrate 40 of the LCD panel includes a substrate 401, a first metal layer 402, a first insulative layer 403, a semiconductor layer 404, a second metal layer, a transparent electrode layer, and a second insulative layer 407.

The difference between the array substrate 40 of the preferred embodiment and the array substrate 20 of the first preferred embodiment is that the transparent electrode layer of the array substrate 40 has a plurality of separated pixel electrodes 4061 since the LCD panel of the preferred embodiment is a vertical alignment type display panel, so as to bend a power line between the array substrate 40 and a color film substrate (not shown in the figure). Therefore, it makes the liquid crystal molecules in each pixel have different deflection angles at the same driving voltage, so that the LCD panel has a better viewing angle.

Similarly, the A area of the array substrate 40 includes a thin-film field-effect transistor. The B area of the array substrate 40 includes the pixel electrode 4061 formed from the transparent electrode layer. The C area of the array substrate 40 includes an internal connection electrode 4063 formed from the transparent electrode layer. The D area of the array substrate 40 includes a trace 4053 formed from the second metal layer 405 and a reinforcing part 4062 formed from the transparent electrode layer 406. The E area of the array substrate 40 includes an external connection electrode 4064 formed from the transparent electrode layer 406.

The working principle of the LCD panel of the preferred embodiment is the same as or similar to the working principle of the LCD panel of the first preferred embodiment; please refer to descriptions in the first preferred embodiment.

The method for manufacturing the array substrate of the LCD panel of the preferred embodiment is the same as or similar to the method for manufacturing the array substrate of the first preferred embodiment; please refer to descriptions in the first preferred embodiment.

In the array substrate, the manufacturing method for the same, and the LCD panel of the present invention, the reinforcing part is disposed on the trace by the transparent electrode layer, so that the trace located on the second metal layer is more stable and is almost unbreakable, thereby ensuring the display quality of the corresponding LCD panel. Therefore, a technical problem of the reduction of the display quality of the corresponding LCD panel is solved. The reduction is caused by the second metal layer as the trace in the existing array substrate being easily broken.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An array substrate, comprising:
    a substrate;
    a first metal layer disposed on the substrate, the first metal layer comprising a scanning line and a gate electrode area of a thin-film field-effect transistor;
    a first insulative layer disposed partially on the first metal layer;
    a semiconductor layer disposed on the first insulative layer;
    a second metal layer disposed on the semiconductor layer, the second metal layer comprising a source electrode area of the thin-film field-effect transistor, a drain electrode area of the thin-film field-effect transistor, a data line, and a trace;
    a transparent electrode layer comprising a pixel electrode connected to the drain electrode area and a reinforcing part covered on the trace, wherein an area of the reinforcing part is the same as an area of the trace, and the reinforcing part is covered over the trace; and
    a second insulative layer disposed on the transparent electrode layer and the thin-film field-effect transistor.

2. The array substrate of claim 1, wherein the transparent electrode layer further comprises:
    an internal connection electrode connected between the first metal layer and the second metal layer.

3. The array substrate of claim 1, wherein the transparent electrode layer further comprises:
an external connection electrode which is connected between the first metal layer and a driving chip, and is connected between the second metal layer and a driving chip.

4. The array substrate of claim 1, wherein the first metal layer has a thickness between 0.1 μm and 0.6 μm, and the second metal layer has a thickness between 0.1 μm and 0.6 μm.

5. The array substrate of claim 1, wherein the first insulative layer has a thickness between 0.2 μm and 0.5 μm, the semiconductor layer has a thickness between 0.1 μm and 0.3 μm, and the second insulative layer has a thickness between 0.2 μm and 0.5 μm.

6. The array substrate of claim 1, wherein the transparent electrode layer has a thickness between 0.01 μm and 0.1 μm.

7. A method for manufacturing an array substrate, comprising the following steps of:
(A) forming a layered structure onto a substrate, wherein the layered structure is a first metal layer;
(B) patterning the layered structure to form a scanning line and a gate electrode area of a thin-film field-effect transistor;
(C) forming sequentially a first insulative layer, a semiconductor layer, and a second metal layer onto the layered structure;
(D) patterning the layered structure to form a source electrode area of the thin-film field-effect transistor, a drain electrode area of the thin-film field-effect transistor, a data line, and a trace;
(E) forming a transparent electrode layer onto the layered structure, and patterning the layered structure to form a pixel electrode and a reinforcing part covered on the trace, wherein an area of the reinforcing part is the same as an area of the trace, and the reinforcing part is covered over the trace; and
(F) forming a second insulative layer onto the layered structure, and patterning the layered structure to cover the transparent electrode layer and the thin-film field-effect transistor.

8. The method for manufacturing the array substrate of claim 7, wherein the step (E) further comprises the following step of:
forming the transparent electrode layer onto the layered structure, and patterning the layered structure to form an internal connection electrode,
wherein the internal connection electrode is connected between the first metal layer and the second metal layer.

9. The method for manufacturing the array substrate of claim 7, wherein the step (E) further comprises the following step of:
forming the transparent electrode layer onto the layered structure, and patterning the layered structure to form an external connection electrode,
wherein the external connection electrode is connected between the first metal layer and a driving chip, and is connected between the second metal layer and a driving chip.

10. The method for manufacturing the array substrate of claim 7, wherein the first metal layer has a thickness between 0.1 μm and 0.6 μm, and the second metal layer has a thickness between 0.1 μm and 0.6 μm.

11. The method for manufacturing the array substrate of claim 7, wherein the first insulative layer has a thickness between 0.2 μm and 0.5 μm, the semiconductor layer has a thickness between 0.1 μm and 0.3 μm, and the second insulative layer has a thickness between 0.2 μm and 0.5 μm.

12. The method for manufacturing the array substrate of claim 7, wherein the transparent electrode layer has a thickness between 0.01 μm and 0.1 μm.

13. A liquid crystal display (LCD) panel, comprising: a color film substrate, an array substrate, and a liquid crystal layer sandwiched between the color film substrate and the array substrate, wherein the array substrate comprises:
a substrate;
a first metal layer disposed on the substrate, the first metal layer comprising a scanning line and a gate electrode area of a thin-film field-effect transistor;
a first insulative layer disposed partially on the first metal layer;
a semiconductor layer disposed on the first insulative layer;
a second metal layer disposed on the semiconductor layer, the second metal layer comprising a source electrode area of the thin-film field-effect transistor, a drain electrode area of the thin-film field-effect transistor, a data line, and a trace;
a transparent electrode layer comprising a pixel electrode connected to the drain electrode area and a reinforcing part covered on the trace, wherein an area of the reinforcing part is the same as an area of the trace, and the reinforcing part is covered over the trace; and
a second insulative layer disposed on the transparent electrode layer and the thin-film field-effect transistor.

14. The LCD panel of claim 13, wherein the transparent electrode layer further comprises:
an internal connection electrode connected between the first metal layer and the second metal layer.

15. The LCD panel of claim 13, wherein the transparent electrode layer further comprises:
an external connection electrode which is connected between the first metal layer and a driving chip, and is connected between the second metal layer and a driving chip.

16. The LCD panel of claim 13, wherein the LCD panel is a twisted nematic display panel or a vertical alignment type display panel.

17. The LCD panel of claim 13, wherein the first metal layer has a thickness between 0.1 μm and 0.6 μm, and the second metal layer has a thickness between 0.1 μm and 0.6 μm.

18. The LCD panel of claim 13, wherein the first insulative layer has a thickness between 0.2 μm and 0.5 μm, the semiconductor layer has a thickness between 0.1 μm and 0.3 μm, and the second insulative layer has a thickness between 0.2 μm and 0.5 μm.

19. The LCD panel of claim 13, wherein the transparent electrode layer has a thickness between 0.01 μm and 0.1 μm.

* * * * *